United States Patent
Schuman et al.

(10) Patent No.: US 7,464,950 B2
(45) Date of Patent: Dec. 16, 2008

(54) CONTINUOUS FIBER CARBON FORK

(75) Inventors: Brian E. Schuman, Madison, WI (US); Douglas A. Cusack, Cottage Grove, WI (US); Sridharan Madhavan, Marshall, WI (US); James Colegrove, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 357 days.

(21) Appl. No.: 10/881,539

(22) Filed: Jun. 30, 2004

(65) Prior Publication Data

US 2005/0012299 A1 Jan. 20, 2005

Related U.S. Application Data

(60) Provisional application No. 60/483,665, filed on Jun. 30, 2003.

(51) Int. Cl.
*B62K 21/02* (2006.01)
(52) U.S. Cl. .................... 280/279; 280/288.3
(58) Field of Classification Search ............... 280/279, 280/288.3
See application file for complete search history.

(56) References Cited

U.S. PATENT DOCUMENTS

| | | | | |
|---|---|---|---|---|
| 4,828,285 A | | 5/1989 | Foret et al. ................ 280/279 |
| 5,016,895 A | * | 5/1991 | Hollingsworth et al. ..... 280/280 |
| 5,039,470 A | | 8/1991 | Bezin et al. ................ 264/255 |
| 5,076,601 A | * | 12/1991 | Duplessis ................ 280/281.1 |
| 5,078,417 A | | 1/1992 | Mouritsen ................ 280/280 |
| 5,080,385 A | * | 1/1992 | Duplessis ................ 280/281.1 |
| 5,181,732 A | * | 1/1993 | Bezin et al. ............... 280/279 |
| 5,215,322 A | * | 6/1993 | Enders ................... 280/231 |
| 5,364,115 A | * | 11/1994 | Klein et al. ............... 280/288 |
| 5,609,349 A | | 3/1997 | Buckmiller et al. ......... 280/280 |
| 5,692,764 A | | 12/1997 | Klein et al. ............... 280/279 |
| 5,762,352 A | * | 6/1998 | Lee ....................... 280/280 |
| 5,944,932 A | | 8/1999 | Klein et al. ............... 156/245 |
| 6,109,638 A | * | 8/2000 | Colegrove ................ 280/288.3 |
| 6,655,707 B2 | * | 12/2003 | Buckmiller et al. ......... 280/279 |
| 6,805,372 B2 | * | 10/2004 | Gueugneaud ............. 280/280 |
| 6,955,372 B1 | * | 10/2005 | Fritschen ................ 280/281.1 |
| 2004/0061302 A1 | * | 4/2004 | Parlee ..................... 280/274 |
| 2007/0257466 A1 | * | 11/2007 | Murphy et al. ............. 280/276 |

FOREIGN PATENT DOCUMENTS

JP 01148682 A * 6/1989

* cited by examiner

*Primary Examiner*—Paul N Dickson
*Assistant Examiner*—Daniel Yeagley
(74) *Attorney, Agent, or Firm*—David C. Brezina; Barnes & Thornburg LLP

(57) ABSTRACT

A continuous fiber reinforced plastic bicycle fork has continuous fibers extending from the tip of the fork blades to the steer tube, formed through optimum compaction, low void molding resulting in precise forming of the fork shell such that a metal steer tube, metal bearing races, metal dropouts and metal brake mount are used to attach metal components such as a headset and star-fangled nut, handlebar stem, wheel and brake thereby eliminating metal component to carbon fiber contact to preserve the integrity of the fiber reinforcements and plastic matrix.

15 Claims, 3 Drawing Sheets

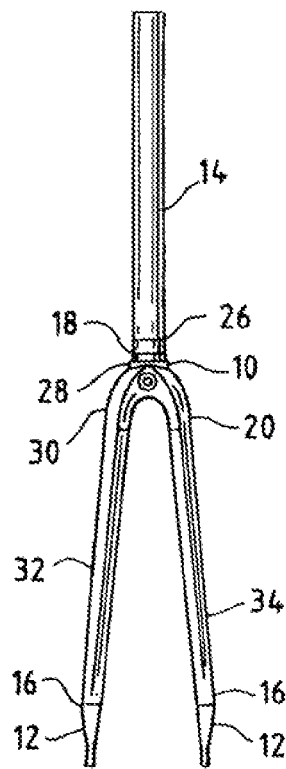
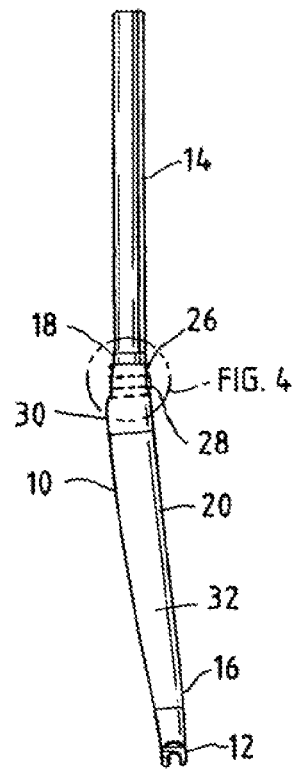
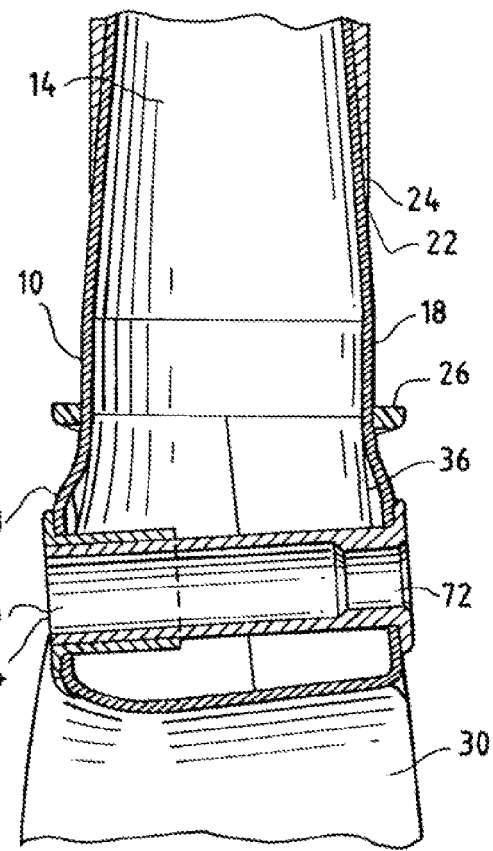

FIG. 5
FIG. 6
FIG. 7
FIG. 8
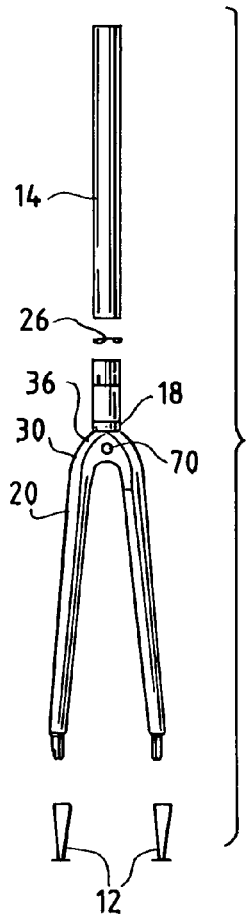
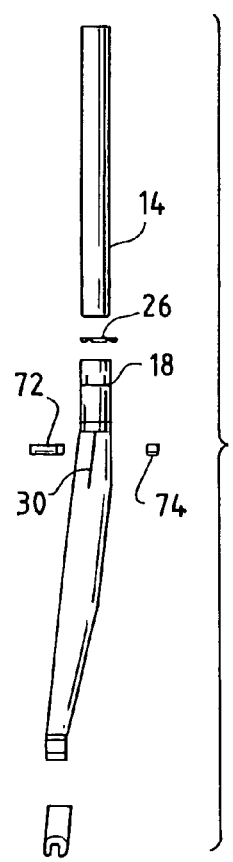
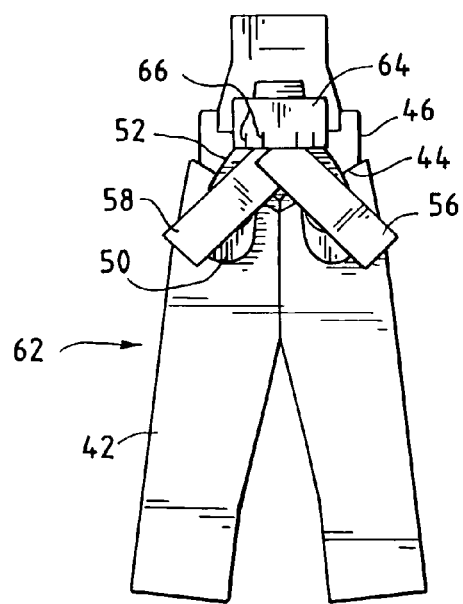
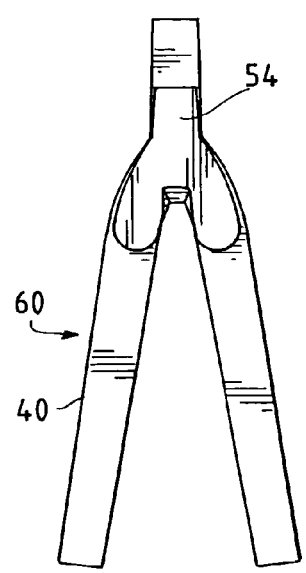

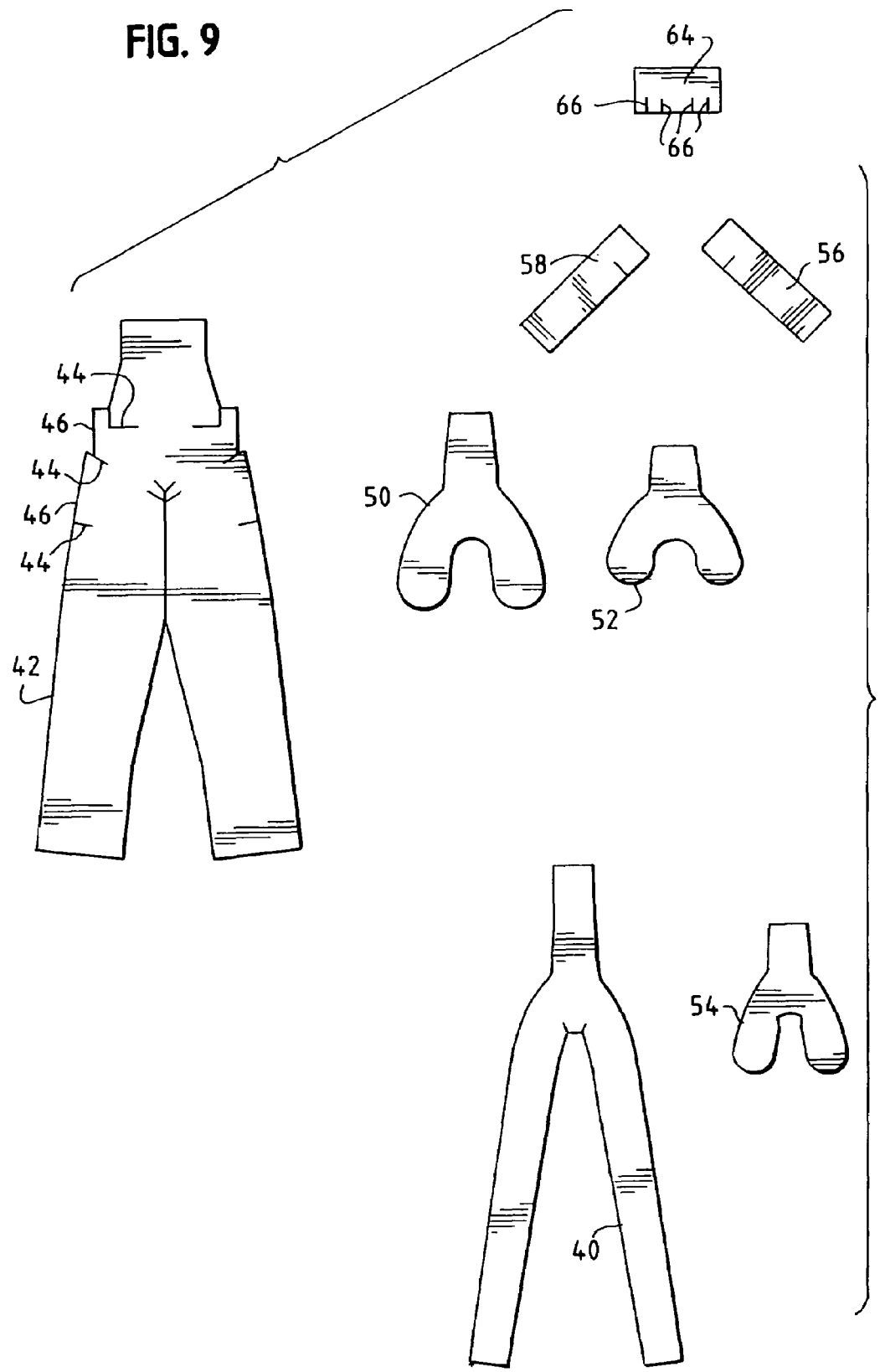

CONTINUOUS FIBER CARBON FORK

CLAIM FOR PRIORITY

Applicant's claim priority of U.S. Provisional Application No. 60/483,665 filed Jun. 30, 2003.

BACKGROUND OF THE INVENTION

1. Field of the Invention

The invention is a continuous fiber carbon fork for a bicycle and a method of manufacturing a continuous fiber carbon fork using optimum compaction, low void molding of fiber reinforced plastic to form a fork having laminations from tip to steer tube which have continuous fibers.

2. Description of Related Art

Notable in composite bicycle frame patents is the fact that the disclosures in the leading patents focus on the frame itself, to the exclusion of the fork. Thus, Nelson U.S. Pat. No. 6,270,104 B1, Duplessis U.S. Pat. No. 5,076,601, Trimble U.S. Pat. No. 5,158,733, Brezina U.S. Pat. No. 4,493,749 and Derujinsky U.S. Pat. No. 4,900,048 do not show forks, while Trimble U.S. Pat. Nos. 4,923,203 and 4,982,975 show forks, but only as part of the environment.

An example of a threadless fork and handlebar stem combination is shown in Edwards, U.S. Pat. No. 5,865,069.

Generally, prior art bicycle fork solutions have included the metal fork with a strong crown, and a steer tube on the top, with tubular fork blades ending in dropouts. Fiber reinforced plastic composite forks have generally used the strong-crown and blade model, or have molded two halves, with the blades extending into the steer tube area, but being subdivided in halves, that were bonded together. Foret U.S. Pat. No. 4,828,285, Hollingsworth U.S. Pat. No. 5,016,895 and Buckmiller U.S. Pat. No. 5,609,349 are representative of the high-strength crown approach, although Foret shows the blade halves as an alternative embodiment. Klein U.S. Pat. Nos. 5,944,932 and 5,692,764 and Bezin U.S. Pat. Nos. 5,039,470 and 5,181,732 are representative of the two blade halves approach. In each approach to a composite fork, separate metal dropouts are used for wheel attachment, primarily because of wear considerations as damage to a plastic composite resulting from wheel attachment can compromise strength. The aforementioned patents are incorporated by reference as if fully set forth herein.

SUMMARY OF INVENTION

The invention teaches the use of optimum compaction, low void molding of a bicycle fork with comolded dropouts and a bonded steer tube and continuous fibers extending from the tip to steer tube. The fork is completely hollow throughout its length. A lay-up schedule for the laminations in combination with specific structural shapes enables a strong light fork having no extra pieces for reinforcement at the fork crown or brake attachment, except where directly contacting the brake bolt.

A bonded steer tube enables the use of a multiplicity of materials such as the preferred aluminum, steel, titanium, or carbon fiber reinforced plastic. Beveling or tapering the fiber reinforced plastic shell and the steer tube enables a gradual transition zone of carbon crown and legs to the metal steer tube. This allows for a smooth stress transition zone from the crown region to the steer tube.

Molding the shell for the fork enables precise forming of the crown race to size. No post machining is required which therefore allows for continuous fibers at the highest stress areas. Bonded on the fork is also a crown race load dispersion ring An alternative embodiment would enable an entire, all fiber reinforced plastic fork to be molded in one piece from the fork tips to the end of the steer tube—instead of bonding on the steer tube.

The steer tube of the invention is particularly advantageously adapted to use in the recently popular threadless fork arrangement in which the handlebar stem clamps to the exterior of the steer tube under preload from an adjusting cap, thereby locking a top bearing race in place.

The invention here uses a method which forms a bicycle fork forming a complete shell using main laminations which contain continuous fibers extending from the tip to the steer tube. A preferably aluminum steer tube extension is bonded to a steer tube portion of the shell. A crown bearing race is bonded at the base of the steer tube portion.

The dropouts are preferably socket type dropouts comolded with the forming and curing of the shell. An adhesive placed in the mold securely bonds the dropouts, while the laminating resin formed into the prepreg laminations provides a solid matrix for the fiber reinforcements.

The aluminum steer tube extension receives a star-fangled nut of a typical threadless headset. The use of aluminum or other metal is advantageous in a threadless configuration because it suffers less from strength reduction as a result of the embedding of the star-fangled nut teeth in the interior wall, when compared to a fiber reinforced plastic composite material. The use of high modulus composite material extending continuously into the steer tube adds to overall fork strength

BRIEF DESCRIPTION OF DRAWINGS

FIG. 1 is a front elevational view of the bicycle fork.
FIG. 2 is a right side elevational view of the bicycle fork.
FIG. 3 is a top plan view of the bicycle fork.
FIG. 4 is an enlarged sectional view of the crown and steer tube portions of the bicycle fork.
FIG. 5 is a front exploded view of the bicycle fork.
FIG. 6 is a front exploded view of the bicycle fork.
FIG. 7 is a plan view of the front laminations before overlapping around a bladder and molding.
FIG. 8 is a plan view of the rear laminations before overlapping around a bladder and molding.
FIG. 9 is a plan view of the complete set of preforms before overlapping around a bladder and molding.

DESCRIPTION OF PREFERRED EMBODIMENTS

The invention uses optimum compaction, low void molding, consistent with the teachings of Nelson U.S. Pat. No. 6,270,104 B1, of a completely hollow bicycle fork 10 with comolded dropouts 12 and a bonded steer tube 14. Continuous fibers in the fork extend from the tip 16 to steer tube base 18. The fiber reinforced plastic structure extending in this manner is referred to as the shell 20. Tube 14 is formed with a beveled bottom edge 22 which mates with a corresponding beveled top edge 24 of base 18. Beveled edges 22, 24 provide a gradual transition zone for the fiber reinforced plastic to metal joint thereby providing superior durability and predictability in strength properties as well as avoiding abrupt joints that result in stress concentrations. While aluminum is preferred for tube 14, other materials could be used such as steel or titanium. Additionally, should a carbon fiber tube be determined to be acceptable, a machine made tube using wound fibers could be economically bonded to the molded shell, consistent with the principles of lug-and-tube construction described in the Nelson patent referenced above.

Also bonded to the fork 10 is crown race 26. This is located above crown race load dispersion ring 28 as a unit to better distribute loads from the bicycle headset to the fork crown 30. The other portions of shell 20 are fork blades 32, 34.

Molding the shell 20 for the fork 10 enables precise forming of the crown race mounting 36 to size. Because of the precision enabled by high pressure, conforming bladder molding, no post machining is required. Because a machining process would, by definition, remove material, precision molding therefore allows for continuous fibers at the highest stress areas.

Fork shell 20 is formed using front main lamination or net preform 40, and rear main lamination or lap preform 42 which contain continuous fibers extending from the tip 16 to the top edge 24 of steer tube base 18. The general lay-up practices of the Nelson method, with 0, 45 and 90 degree orientation of individual preimpregnated unidirectional fibers, preferably carbon fibers, are used. Thus, with eight layers in a given lamination, two of the layers would be oriented 'lengthwise' or along the long axis of laminations 40, 42. Additional layers would increase strength, accordingly, with it being generally desirable, but not mandatory, to add layers in a number that would result in at least one additional longitudinal layer and each other incremental angular orientation.

Front lamination or net 40 has plain edges consistent with its bending forwardly in the mold. Rear lamination or lap 42 has a plurality of slits 44 in its somewhat larger width that define separate tabs 46 which will be formed to overlap lamination 40, and because of the forward curvature of the fork 10, each tab 46 will overlap an adjacent tab 46. This overlap provides additional thickness and strength and slightly alters the angular orientation relative to a curved axis conforming to the forward curvature of the fork blades 32, 34.

Three yoke reinforcing preforms, large yoke reinforcing preform 50, medium yoke reinforcing preform 52 and small yoke reinforcing preform 54 are used in the high stress area of the fork crown 30. It will be noted that the small preform 54 is layed up immediately adjacent front lamination or net 40. Medium and large preforms 52, 54 are layed up adjacent rear or lap preform 42. Thus, as the molding process separates the front and rear lay-ups 60, 62 by a bladder, with tabs 46 and portions of each lay-up 60, 62 overlapping on the sides of the shell 20, the yoke reinforcements 52, 54 are on the rear of the fork 10, which is raked, so that the rear is generally under tension under normal loading conditions. Of course, load conditions change as the bicycle is operated. A good explanation of the forces acting on a fork is provided in Klein U.S. Pat. No. 5,944,932.

Additional crotch reinforcements 56, 58 are generally rectangular preforms placed in a crossing manner at the yoke to reinforce the fork crown 30 and tops of the blades 32, 34 where they merge into the crown 30. Reinforcing tape 64 reinforces the area of the shell 20 proximate the place where the steer tube base 18 merges with the crown 30. This rectangular tape has four slits 66 to better enable tape 64 to conform to the complex curvature of base 18 and crown. As described in the Nelson method, conformance of the various laminations to the shape of the shell 20 is important in eliminating strength reducing voids.

The completely molded shell 20 based on the coinciding with dropouts 12 adhesively bonded during the molding and curing process is a finished structural unit. Functionality as a complete bicycle fork 10 is accomplished by bonding steer tube 14 to base 18 using a suitable curable adhesive, such as an epoxy. Additionally, a molded in or machined aperture (not shown) receives brake mounting 70 comprising a front flanged cylinder 72 and a rear flanged cylinder 74. This provides a metal member in which a standard brake mounting bolt can be fitted. Thus, metal parts on fork 10 are used in those locations where fork 10 is attached to metal components such as a headset and star-fangled nut, handlebar stem, wheel and brake thereby eliminating metal component to carbon fiber contact to preserve the integrity of the fiber reinforcements and plastic matrix. Similar considerations would apply to a more traditional 'quill' or wedge locking handlebar stem which one of ordinary skill knows locks in place by outward pressure against the interior wall of a steer tube, using a threaded headset. The cutting of threads in the steer tube is more easily accomplished with metal.

We claim:

1. A fiber reinforced plastic fork for a cycle, the fork having a steer tube, crown portion, a blade extending from the crown portion to a tip, the tip having a wheel engaging member mounted thereto, comprising:

fiber reinforced plastic having overlapping layers of unidirectional fibers in crossing relation to one another, compacted against one another in a plastic matrix and having low or no voids therebetween, in a fiber reinforced plastic shell;

the fork having unidirectional fibers in a lamination extending from the tip to the steer tube, which lamination has first fibers being longitudinally continuous and extending from the tip to the steer tube and second fibers arranged proximate one another to be adjacently continuous but not extend longitudinally continuously from the tip to the steer tube;

the fiber reinforced plastic shell of the fork being formed substantially entirely of laminations of unidirectional synthetic fibers in which each lamination is comprised of layers of individual parallel fibers;

the fiber reinforced plastic shell being formed of walls defined between continuous inner and outer surfaces;

said walls substantially entirely forming a structural support between a wheel and the cycle;

the synthetic fibers being carbon fibers;

the wheel engaging member is a dropout;

said dropout, said plastic shell and said steer tube being formed and arranged to provide a smooth stress transition zone from the crown portion to the steer tube;

a crown race mounting formed proximate the transition between the steer tube and said crown portion;

comolding the shell for the fork so that said crown race mounting is formed to size so that no post machining is required for operative receipt of a bearing for the cycle, thereby maintaining said first fibers longitudinally continuous as they extend longitudinally through the highest stress areas of the fork;

said dropout being formed of metal;

the steer tube being formed in part of metal;

said fiber reinforced plastic shell being formed and arranged in an uncured state to contact mating portions of the steer tube and dropout;

said uncured shell, dropout and steer tube being placed in a mold and comolded to form said fork;

the fork having a pair of blades each ending in the metal dropout;

the fork being operatively connected to the cycle;

the steer tube of the invention receiving a threadless fork arrangement in which the handlebar stem clamps to an exterior of the steer tube under preload from an adjusting cap, thereby locking a top bearing race in place;

the dropouts are formed to each have a socket that receives a tip portion of the shell, the dropouts and shell being comolded with the forming and curing of the shell;

an adhesive placed in the mold securely bonds the dropouts, while a laminating resin formed into prepreg laminations provides a solid matrix for the fiber reinforcements.

2. A fiber reinforced plastic fork for a cycle, the fork having a steer tube, crown portion, a blade extending from the crown portion to a tip, the tip having a wheel engaging member mounted thereto, comprising:

fiber reinforced plastic having overlapping fibers in crossing relation to one another, compacted against one another in a plastic matrix and having low or no voids therebetween, in a fiber reinforced plastic shell;

the fork having unidirectional fibers in a lamination extending from the tip to the steer tube, which lamination has first fibers being longitudinally continuous and extending from the tip to the steer tube and second fibers arranged proximate one another to be adjacently continuous but not extend longitudinally continuously from the tip to the steer tube.

3. The fork of claim 2, further comprising:

the fiber reinforced plastic shell of the fork being formed substantially entirely of laminations of unidirectional synthetic fibers in which each lamination is comprised of layers of individual parallel fibers.

4. The fork of claim 3, further comprising:

the fiber reinforced plastic shell being formed of walls defined between continuous inner and outer surfaces;

said walls substantially entirely forming a structural support between a wheel and the cycle.

5. The fork of claim 4, further comprising:

the synthetic fibers being carbon fibers.

6. The fork of claim 5, whereby the wheel engaging member is a dropout;

said dropout, said plastic shell and said steer tube being formed and arranged to provide a smooth stress transition zone from the crown portion to the steer tube.

7. The fork of claim 6, further comprising:

a crown race mounting formed proximate the transition between the steer tube and said crown portion;

comolding the shell for the fork so that said crown race mounting is formed to size so that no post machining is required for operative receipt of a bearing for the cycle, thereby maintaining continuous fibers at the highest stress areas of the fork.

8. The fork of claim 7, further comprising:

the wheel engaging member being a metal dropout;

the steer tube being formed in part of metal;

said fiber reinforced plastic shell being formed and arranged in an uncured state to contact mating portions of the steer tube and dropout;

said uncured shell, dropout and steer tube being placed in a mold and comolded to form said fork.

9. The fork of claim 7, further comprising:

said fork is formed as an all fiber reinforced plastic fork to be molded in one piece from the fork tips to an end of the steer tube.

10. The fork of claim 8, further comprising:

the fork having a pair of blades each ending in the dropout;

the fork being operatively connected to the cycle;

the steer tube of the invention receiving a threadless fork arrangement in which the handlebar stem clamps to an exterior of the steer tube under preload from an adjusting cap, thereby locking a top bearing race in place.

11. The fork of claim 10, further comprising:

the dropouts are formed to each have a socket that receives a tip portion of the shell, the dropouts and shell being comolded with the forming and curing of the shell;

an adhesive placed in the mold securely bonds the dropouts, while a laminating resin formed into prepreg laminations provides a solid matrix for the fiber reinforcements.

12. An optimum compaction, low void molded, completely hollow bicycle fork with comolded dropouts and a bonded steer tube formed having continuous fibers in the fork, said fibers extending from a tip to a steer tube base forming a fiber reinforced plastic structure shell;

said fork having the steer tube bonded to the shell and a dropout bonded to the tip;

a gradual transition zone for each shell to metal joint;

a crown interconnecting the steer tube and a leg, said leg having the tip at an end remote from said crown;

a crown race bonded to the fork attached to a crown race mounting which is formed to size without machining thereby allowing for continuous fibers at the highest stress areas;

said shell being formed using a front main lamination and a rear main lamination each of which contain at least one longitudinally continuous fiber extending from the tip to a top edge of said steer tube base with other fibers arranged so that their long axes are nonparallel to the longitudinally continuous fiber;

yoke and crotch reinforcing laminations being formed in the high stress area of the fork and crown;

said shell is comolded with said dropout adhesively bonded during a molding and curing process to form a finished structural unit.

13. The fork of claim 12, further comprising:

said fork has a metal steer tube bonded to said steer tube base proximate said crown;

said crown having a molded in or machined aperture which receives a brake mounting formed of a front flanged cylinder and a rear flanged cylinder;

said dropout being formed of metal;

a metal bearing race being mounted to said crown race;

said metal steer tube, metal brake mounting, metal dropout and said metal crown race providing metal to metal contact for bicycle components when said fork is installed on a bicycle.

14. The fork of claim 12, further comprising:

said leg being one of a pair of blades each ending in a dropout;

said shell having said blades, crown and steer tube being generally shaped in the manner of an inverted "Y";

said shell being formed of high tensile strength fiber in a cured plastic matrix as a single continuous walled structure being hollow across all sections which are nonparallel to the fibers in the wall.

15. The fork of claim 14, further comprising:

said steer tube is a metal steer tube bonded to said steer tube base proximate said crown;

said crown having a molded in or machined aperture which receives a brake mounting formed of a front flanged cylinder and a rear flanged cylinder;

said dropout being formed of metal;

a metal bearing race being mounted to said crown race;

said metal steer tube, metal brake mounting, metal dropout and said metal crown race providing metal to metal contact for bicycle components when said fork is installed on a bicycle.

* * * * *